United States Patent
Krestine et al.

(10) Patent No.: US 6,833,072 B1
(45) Date of Patent: Dec. 21, 2004

(54) FLEXIBLE DIP TUBE FILTER WITH WEIGHT

(75) Inventors: Joseph R. Krestine, Leawood, KS (US); Linn D. Wanbaugh, Blue Springs, MO (US)

(73) Assignee: Saint-Gobain Calmar Inc., City of Industry, CA (US)

( * ) Notice: Subject to any disclaimer, the term of this patent is extended or adjusted under 35 U.S.C. 154(b) by 0 days.

(21) Appl. No.: 10/698,013

(22) Filed: Oct. 31, 2003

(51) Int. Cl.$^7$ .............................. B67D 5/58; B01D 35/02
(52) U.S. Cl. .................... 210/416.1; 210/460; 210/463; 222/189.1; 222/464.4
(58) Field of Search .............................. 210/416.1, 459, 210/460, 463; 222/189.1, 189.06, 464.1, 464.4

(56) References Cited

U.S. PATENT DOCUMENTS

| | | | |
|---|---|---|---|
| 1,293,850 A | * 2/1919 | Mathis | .................. 222/401 |
| 3,209,954 A | 10/1965 | Webster | .................. 222/189 |
| 4,273,272 A | * 6/1981 | Blanc | .................. 222/464.4 |
| 4,660,741 A | * 4/1987 | Kirschner et al. | .................. 222/1 |
| 5,195,664 A | * 3/1993 | Rhea | .................. 222/464.4 |
| 5,636,770 A | * 6/1997 | Hachinohe et al. | .................. 222/402.1 |
| 5,934,519 A | 8/1999 | Kim et al. | .................. 222/464.4 |
| 5,979,715 A | 11/1999 | Emrick | .................. 222/464.4 |
| 6,227,412 B1 | 5/2001 | Sweeton | .................. 222/189.1 |
| 6,264,073 B1 | 7/2001 | Good et al. | .................. 222/464.4 |
| 6,394,319 B1 | 5/2002 | Pucillo | .................. 222/383.1 |

* cited by examiner

*Primary Examiner*—Fred G. Prince
(74) *Attorney, Agent, or Firm*—Dykema Gossett PLLC

(57) ABSTRACT

A flexible dip tube for a hand held sprayer has a filter element with a projection extending into the distal end of the dib tube for frictionally mounting the filter element thereto, the other end of the filter element extending beyond the distal end and containing filter material in communication with the interior of the tube, and a weight surrounding both the distal end and the projection of the filter element or weighting down the distal end during use.

7 Claims, 1 Drawing Sheet

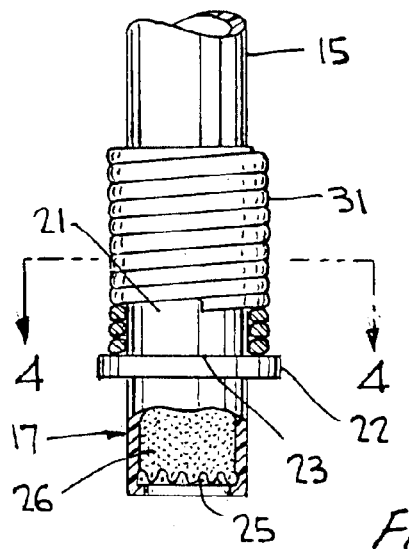
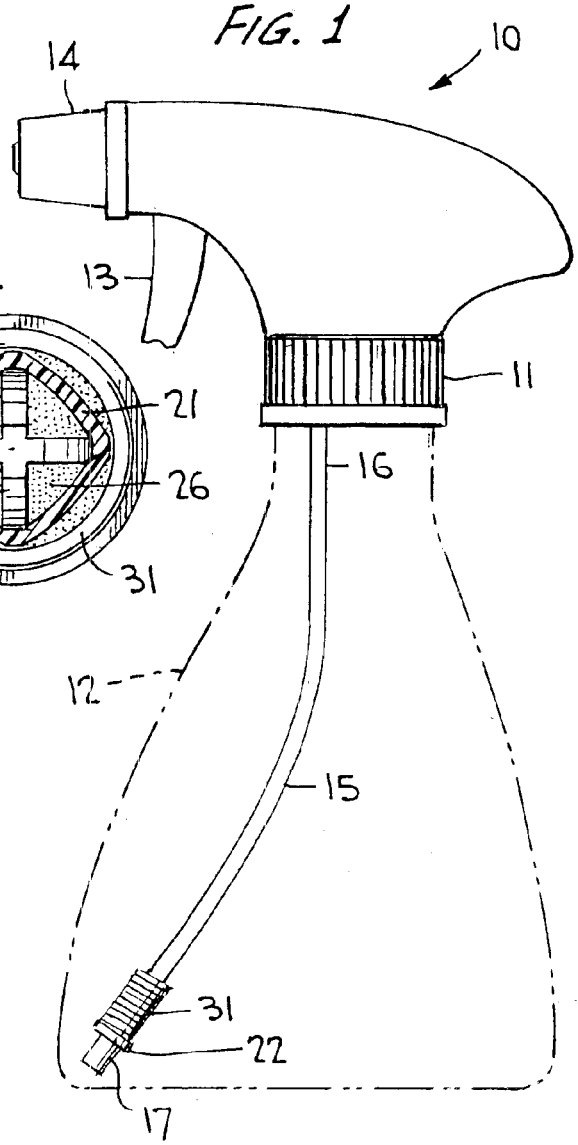
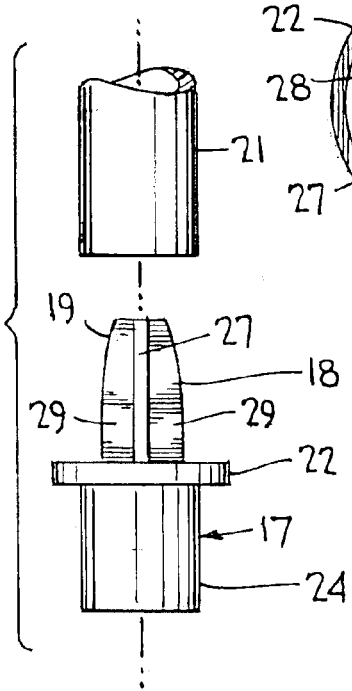

US 6,833,072 B1

FLEXIBLE DIP TUBE FILTER WITH WEIGHT

BACKGROUND OF THE INVENTION

This invention relates to a flexible dip tube for a hand held sprayer of especially the trigger actuated type, and more particularly to a flexible dip tube for the sprayer having a weighted distal end with a mounted filter element.

Many of the known prior art flexible dip tubes for hand held sprayers have a filter inserted into the free end of the flexible tube, but with no weight provided, or have a weight extending into the free end of the tube, although no filter is provided. U.S. Pat. No. 6,394,319 discloses what is referred to as a weight feeder which includes a flexible dip tube for a hand held dispenser having a weight with a screen attached to the end of the flexible tube. However, the weight feeder has a center channel with one opening at one end of the channel connected to the distal end of the flexible tube, and a liquid intake opening at the opposite end of the channel for feeding liquid through the channel into the flexible tube for dispensing. The weight feeder can comprise a screen covering the liquid intake opening to prevent particles or debris getting into the liquid dispenser. The weight feeder itself must be of sufficient weight so that it can move with liquid inside the liquid dispensing bottles when the bottles are tilted.

Such a weight feeder is disadvantaged in that the weight is capable of separating from the distal end of the tube as the center channel of the weight feeder appears designed to simply receive the distal end of the tube which is likely to fail as a tight securement during repeated use of the dispenser especially during upright and inverted movements. Besides, the weight feeder must be replaced in its entirety by a heavier weight feeder when dispensing liquids of higher viscosities. This adds to the cost of the weighted dip tube and presents a serious drawback.

SUMMARY OF THE INVENTION

It is therefore an object of the present invention to provide a flexible dip for a hand held dispenser having a weighted distal end which extends into the container to which the dispenser is mounted, and has a filter element securedly mounted to the distal end of the dip tube, the weight and the filter being of a simple design easy to manufacture and install yet highly efficient in weighting down the distal end of the flexible tube during use to maintain it immersed below the liquid level during tilting and inversion of the container.

The filter element has a probe at one end extending into the distal end of the tube for frictionally mounting the filter element thereto, while the other end of the filter element extends beyond the distal end and contains filter material in communication with the interior of the tubular body forming the flexible dip tube. A weight surrounds the distal end and the one end of the filter element for weighting down the distal end of the flexible tube during use. The probe is designed in crosswise dimension as to be slightly greater than the inner diameter of the tubular body for enhancing the frictional mounting of the filter element in place. Or, the probe in crosswise dimension may be at least equal to the inner diameter of the flexible tube, the weight being tubular and having an inner diameter slightly less than the outer diameter of the tubular body so as to enhance the frictional mounting of the filter element in place. The filter element may have an outer annular flange for both limiting the extent of its probe into the distal end of the tube and for supporting the weight surrounding the tube distal end.

Other objects and advantages and novel features of the invention will become more apparent from the following detailed description of the invention when taken into conjunction with the accompanying drawings.

BRIEF DESCRIPTION OF THE DRAWINGS

FIG. 1 is a side elevational view of the weighted flexible dip tube with filter shown connected to a hand held sprayer to be mounted on a container of liquid to be sprayed;

FIG. 2 is a detailed view at an enlarged scale of the distal end of the flexible dip tube showing the weight and the filter according to the invention mounted thereto;

FIG. 3 is a view similar to FIG. 2 as expanded showing the filter element in side elevation relative to the tube distal end but without the weight for the sake of clarity; and FIG. 4 is a sectional view at an enlarged scale taken substantially along the line 3—3 of FIG. 2.

DETAILED DESCRIPTION OF THE INVENTION

Turning now to the drawings wherein like reference characters refer to like and corresponding parts throughout the several views, a hand held sprayer of the trigger actuated type is generally designated 10 in FIG. 1 of any known type which may be a manually actuated pump sprayer or which may be a battery operated sprayer, forming no part of the invention. The sprayer typically has a container closure 11 for mounting it to a container 12 of liquid to be sprayed upon manual actuation of a trigger lever 13 or the like for dispensing the liquid in known manner through a nozzle 14 mounted at the front end of the sprayer. A flexible dip tube 15, which may be of a polyvinylchloride, is attached at its approximate end 16 to the body (not shown) of the sprayer through container closure 11 in known manner. The dip tube extends into the liquid contents in the container below the liquid level and may be of sufficient length to bend toward a predetermined direction.

In accordance with the invention, a filter element generally designated 17, which may be of a polypropylene material, has a projection or probe 18 at one end, which may be chamfered or curved as at 19 at its lead-in end, which extends into distal end 21 of the flexible dip tube (FIG. 3) for securedly connecting the filter element thereto. Element 17 may have an outer annular flange 22 which serves as a stop abutting against outer free edge 23 of the flexible tube upon insertion of projection 18 into the distal end of the tube. The opposite end of the filter element which extends beyond the distal end of the tube in the assembled condition of FIG. 2 may comprise a tubular section 24 containing filter material which may be in the form of a screen 25 and/or other porous filter material 26 of any known type. The filter material 25, 26 is in communication with the interior of flexible tube 15 via at least one axial groove 29 provided on projection 18. As shown in FIGS. 3 and 4, the projection may be of cruciform shape formed of crossing wings 27, 28 with the four spaces between the adjacent wings defining four axial grooves 29.

Projection 18 may be of any other suitable design having at least an axial groove therein, without departing from the invention. In any case, the crosswise dimension of the projection, i.e., the width of each wing 27, 28, may be slightly greater than the inner diameter of dip tube 15 to effect a tight frictional connection of the filter element to the distal end of the tube upon insertion of projection 18 into that end. Thus, when press fit into the distal end of the tube, wings 27, 28 cause the tube to stretch or otherwise deform into an essentially non-cylindrical shape given the differential between the crosswise dimension of the projection and the inner diameter of the tube. Otherwise, the distortion of the distal end of the dip tube upon press fitting a differently shaped projection thereinto, will effect a different distortion/deformation of the tube's distal end, within the purview of the invention.

The dip tube, which forms an elongated tubular body, is weighted at its distal end by the provision of a weight 31 which may be in the form of a tightly wound coil spring or the like supported on annular flange 22. The weight, which is of sufficient mass and density to maintain the distal end of the tube immersed below the liquid level in various attitudes of use of the sprayer package, may be assembled in place from proximate end 16 of the dip tube before the tube is connected to the sprayer body. Or, the weight may be assembled to the tube before filter element 17 is mounted in place.

The weight, which essentially is in the form of a cylindrical body, may have an inner diameter in one embodiment which is no less than the outer diameter of tube 15, such that the slightly larger width of wings 27, 28 or the crosswise dimension of projection 18 relative to the inner diameter of the tube, effects the tight frictional fit between the filter element and the tube. Otherwise, the inner diameter of weight 31 can be slightly less than the outer diameter of tube 15 such that, as the weight surrounds both the distal end of the tube and projection 18, the weight serves to press the distal end of the tube tightly against projection 18 for effecting a tight frictional fit between the filter element and the dip tube. And, for yet another embodiment of the invention, both the crosswise dimension of the projection may slightly exceed the inner diameter of the tube, and the inner diameter of the weight can be slightly less than the outer diameter of the tube so that, together, the distal end of the tube is press fitted from its inner diameter as well as from its outer diameter to effect a tight frictional connection between the filter element and the dip tube distal end.

In use, the weighted dip tube with the filter at its distal end prevents entry of debris or other unwanted particulate materials in the liquid from entering either the pump chamber should sprayer 10 be of the pump sprayer type, or from entering the pump gears (not shown) if sprayer 10 is of the battery operated type. The weighted distal end is caused to be immerse in the liquid irrespective of the liquid level and the attitude of the spray package during dispensing.

From the foregoing, it can be seen that the filter element is of simple design easy to fabricate and the steel coil spring is a readily available part which renders the assembly economical to produce. And, the parts can be easily assembled by hand or using automated equipment in an efficient and cost-saving manner, while the weighted dip tube with its filter is efficient and effective in use.

Obviously, many modifications and variations of the present invention are made possible in the light of the above teachings. For example, weight 31 may be in the form of a stack of metal washers or the like in keeping with the invention. It is therefore to be understood that within the scope of the appending claims the invention may be practice otherwise than as specifically described.

What is claimed is:

1. A flexible dip tube for a hand held sprayer, comprising an elongated tubular body having a proximate end for connection to the sprayer and a distal end for extension into a container to which the sprayer is to be mounted, a filter element having one end extending into said distal end for frictionally mounting the filter element thereto, the opposite end of the filter element extending beyond said distal end and containing filter material in communication with the interior of the tubular body, a weight surrounding the distal end and the one end of the filter element for weighting down said distal end during use.

2. The flexible dip tube according to claim 1, wherein said one end of said filter element comprises a projection having a maximum crosswise dimension slightly greater than an inner diameter of the tubular body for enhancing the frictional mounting of the filter element to the body.

3. The flexible dip tube according to claim 2, wherein said projection has at least one longitudinal groove providing the communication between the filter material and the interior of the tubular body.

4. The flexible dip tube according to claim 1, wherein said one end of said filter element has a crosswise dimension at least equal to an inner diameter of the tubular body, and wherein said weight comprises at least one tubular element having an inner diameter slightly less than an outer diameter of the tubular body for enhancing the frictional mounting of the filter element to the body.

5. The flexible dip tube according to claim 1, wherein the filter element has an outer annular flange defining a stop for limiting the extent of the one end of the filter element into the tubular body, the annular flange further defining a support for the weight.

6. The flexible dip tube as in any one of the preceding claims, wherein the weight comprises a coil spring.

7. The flexible dip tube according to claims 1, 2, 3, 4 or 5 wherein the one end of the filter element comprises a projection of cruciform section defining a plurality of axial grooves.

\* \* \* \* \*